(12) United States Patent
Vossel et al.

(10) Patent No.: US 6,511,058 B1
(45) Date of Patent: Jan. 28, 2003

(54) HYDRAULICALLY DAMPING RUBBER BEARING WITH UNCOUPLING ELEMENT

(75) Inventors: Andreas Vossel, Osnabrük (DE); Frank Meyerink, Lohne (DE)

(73) Assignee: ZF Lemförder Metallwaren AG (DE)

( * ) Notice: Subject to any disclaimer, the term of this patent is extended or adjusted under 35 U.S.C. 154(b) by 58 days.

(21) Appl. No.: 09/857,575

(22) PCT Filed: Sep. 29, 2000

(86) PCT No.: PCT/DE00/03450
§ 371 (c)(1),
(2), (4) Date: Jun. 5, 2001

(87) PCT Pub. No.: WO01/25650
PCT Pub. Date: Apr. 12, 2001

(30) Foreign Application Priority Data

Oct. 6, 1999 (DE) .......................... 199 48 307

(51) Int. Cl.[7] .............................. F16F 13/00
(52) U.S. Cl. .................... 267/140.12; 267/219
(58) Field of Search ........... 267/140.11, 140.12, 267/140.13, 140.3, 140.4, 219, 35

(56) References Cited

U.S. PATENT DOCUMENTS

| | | | |
|---|---|---|---|
| 4,690,389 A | * | 9/1987 | West ........................ 188/379 |
| 4,728,086 A | * | 3/1988 | Ishiyama et al. ...... 267/140.12 |
| 5,035,407 A | | 7/1991 | Takeguchi et al. |
| 5,118,087 A | * | 6/1992 | Jordens et al. .............. 248/562 |
| 5,657,510 A | * | 8/1997 | Satori et al. .................. 16/2.2 |
| 5,895,031 A | * | 4/1999 | Meyer et al. .......... 267/140.12 |

FOREIGN PATENT DOCUMENTS

| | | |
|---|---|---|
| DE | 37 23 986 A1 | 2/1988 |
| DE | 38 10 310 A1 | 10/1989 |
| DE | 39 20 891 A1 | 1/1990 |
| DE | 41 21 769 C2 | 1/1992 |
| DE | 195 26 069 A1 | 3/1996 |
| JP | 62118132 | 5/1987 |
| JP | 6-2734 | 1/1994 |

* cited by examiner

*Primary Examiner*—Jack Lavinder
*Assistant Examiner*—Benjamin A Pezzlo
(74) *Attorney, Agent, or Firm*—McGlew and Tuttle, P.C.

(57) ABSTRACT

A hydraulically damping rubber is provided with an uncoupling element. The bearing has an elastomer arranged between an essentially cylindrical inner part and a cylindrical outer sleeve and connected to the inner part by vulcanization. The hydraulically damping rubber bearing has chambers for receiving a damping agent. The chambers are connected by at least one channel arranged in a channel carrier. The uncoupling element is provided for uncoupling the damping action caused by the circulation of the damping agent in the channel or channels against forces of low exciting amplitude introduced into the bearing. The uncoupling element is a separate component from the hydraulically damping rubber bearing, arranged in a recess in a channel carrier space of the bearing. The uncoupling element includes a frame with a membrane fixed in a freely vibrating manner in or on the frame and a radial distance is assigned to the membrane between the channel carrier and the outer sleeve of the bearing, so that a radially directed movement of the membrane is possible.

11 Claims, 3 Drawing Sheets

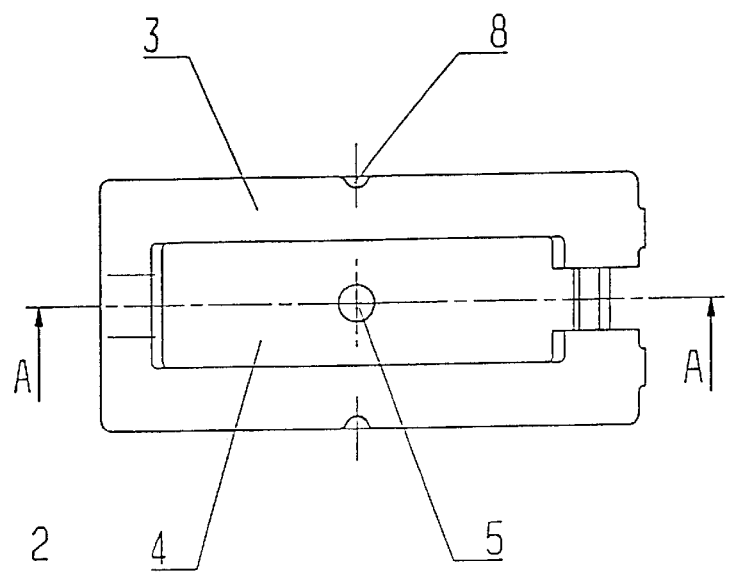
Fig. 2
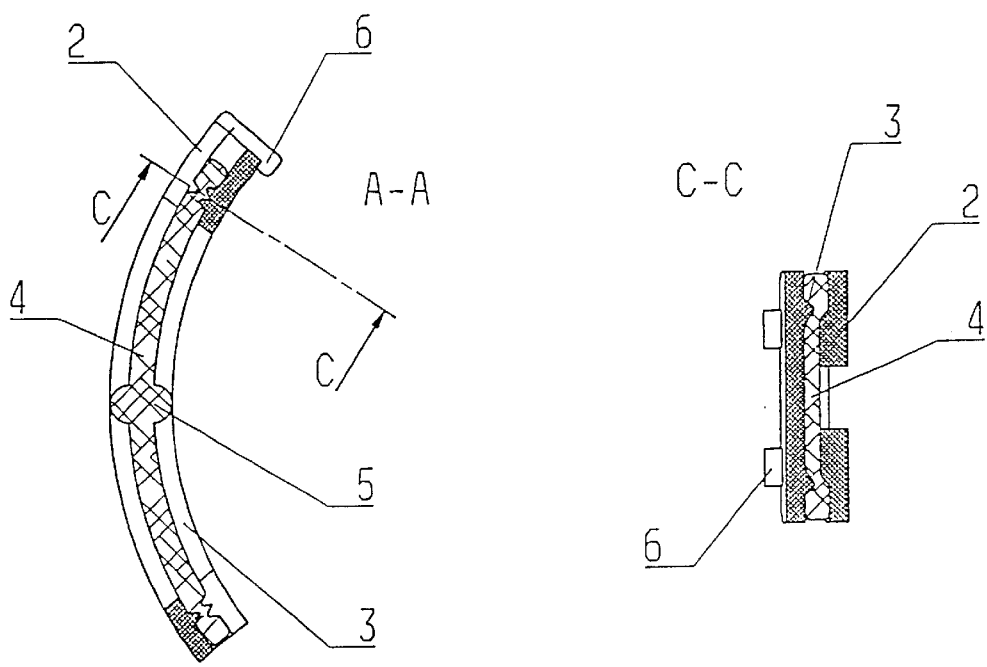
Fig. 3
Fig. 4

HYDRAULICALLY DAMPING RUBBER BEARING WITH UNCOUPLING ELEMENT

FIELD OF THE INVENTION

The present invention pertains to a hydraulically damping rubber bearing with an uncoupling element for uncoupling the damping action of the rubber bearing against forces introduced radially into the bearing with a low exciting amplitude.

BACKGROUND OF THE INVENTION

Rubber bearings are used in many different forms and for many different purposes especially in the manufacture of vehicles. They are used, e.g., in the area of the vehicle axles or also to mount the vehicle unit. The bearings usually comprise a cylindrical inner part, which is surrounded by an elastomer over at least some sections and is connected to same by vulcanization. The above-mentioned parts are finally accommodated by a likewise cylindrical outer sleeve. To support the damping action, the bearings are designed as hydraulically damping bearings for certain applications, in which case chambers for accommodating a damping agent are provided in the elastomer and these chambers are connected to one another by a channel which makes possible the circulation of the damping agent. Damping of the masses is thus brought about by the damping agent swinging to and fro in the channel.

One problem of such bearings is that their steady dynamic load leads to an undesired hardening of the bearing and consequently to the more intense transmission of the structure-borne noise into the interior space of a vehicle. Moreover, forces which are generated in the form of periodically recurring shock loads, e.g., as vibrations of low amplitude, also lead to undesired acoustic problems within certain frequency ranges. Efforts are therefore made to uncouple the damping action of the bearings against such vibrations. Providing hydraulically damping bearings with an uncoupling member or element has been known for this purpose.

A solution used for this purpose provides, among other things, for a special design of the cage enclosed in the elastomer. According to this solution, webs rising up radially extending in the axial direction, which also extend through the channel used for the circulation of the damping fluid, are provided in some sections on the outer contour of the cage. To guarantee the circulation of the fluid in this case as well, these webs are interrupted in multiple areas. An insert part which is able to flutter is inserted between the webs. The flow of the damping agent in the channel is released by the insert part when vibration-like loads of low amplitude briefly appear to achieve an immediate pressure equalization between the damping agent chambers. The pressure equalization now takes place without the flow of appreciable volume flows of the damping agent. The strip-like insert part, which extends over nearly the entire axial length of the bearing, is arranged now between the webs such that it rises up in the radial direction comparably to a rubber lip.

In particular, the markedly increased assembly effort for the bearing is to be considered to be disadvantageous in this solution. In addition, the uncoupling element requires relatively much space in light of the distance between the rubber block with the cage and the outer sleeve. The amplitudes that can be effectively uncoupled in this manner are limited to a narrow range because of the comparatively long tangential paths of the insert part moving between the webs provided on the cage.

SUMMARY AND OBJECTS OF THE INVENTION

The object of the present invention is to provide a hydraulically damping rubber bearing with an uncoupling element, which has a high level of flexibility in terms of the range of the amplitudes to be uncoupled while the bearing can be mounted in a simple manner at the same time.

According to the invention, a hydraulically damping rubber bearing is provided with an uncoupling element. The bearing has an elastomer. The uncoupling element is arranged between an essentially cylindrical inner part and a cylindrical outer sleeve and is connected to the inner part by vulcanization. The hydraulically damping rubber bearing has chambers for receiving a damping agent. The chambers are connected by at least one channel arranged in a channel carrier. The uncoupling element is provided for uncoupling the damping action caused by the circulation of the damping agent in the channel or channels against forces of low exciting amplitude introduced into the bearing. The uncoupling element is a separate component from the hydraulically damping rubber bearing, arranged in a recess in a channel carrier space of the bearing. The uncoupling element includes a frame with a membrane fixed in a freely vibrating manner in or on the frame and a radial distance is assigned to the membrane between the channel carrier and the outer sleeve of the bearing, so that a radially directed movement of the membrane is possible.

The bearing on which the present invention is based comprises, in the known manner, a cylindrical inner part, an elastomer connected to the said inner part by vulcanization, and an outer sleeve accommodating the inner part and the elastomer. To achieve the hydraulic damping action, chambers are provided in the elastomer for a damping agent, which can circulate over at least one channel, which is provided in a channel carrier and connects the chambers to one another. To accomplish the object, the uncoupling element of the bearing according to the present invention is designed as a separate component to be inserted into a recess provided for this purpose. The uncoupling element comprises a frame-like housing and a membrane fixed in a freely vibrating manner in the housing. The uncoupling element and the mount provided for the element in the channel carrier are designed such that the membrane of the component arranged in the bearing can perform a radially directed movement between the channel carrier and the outer sleeve.

The design of the bearing according to the present invention offers a number of advantages. The uncoupling element, designed as a preassembled separate component, can be mounted easily in the course of the manufacture of the bearing. At the same time, the characteristics of the bearing can be varied in a flexible manner by selecting uncoupling elements of various geometric shapes. The amount of fluid that can be uncoupled and consequently the amplitudes or frequencies of the loads occurring, which amplitudes or frequencies can be uncoupled, can be affected very easily especially by varying the thickness of the membrane of the uncoupling element. By controlling the uncoupling by a radial movement of an only thin membrane, the space requirement for the insertion of the uncoupling element between the channel carrier and the outer sleeve of the bearing is, moreover, very small. The thickness of the membrane, which is always small, though differing depending on the setting, leads to low inertia of the arrangement during dynamic processes that occur.

Corresponding to a possible embodiment of the present invention, the recess for receiving the uncoupling element extends in parallel to the channel or channels provided for the circulation of the damping agent between the chambers. However, there is an additional connection in this case between the damping agent chambers via the recess receiving the uncoupling member in the channel carrier, and an immediate pressure equalization can take place via this additional connection when lower exciting amplitudes and, as a result of these amplitudes, radially directed movement of the membrane of the uncoupling element can occur, without the flow of an appreciable amount of damping agent. Low exciting amplitudes shall be defined here as acting forces which lead to a radial deflection of the bearing by about 0.1 mm or less.

According to an advantageous embodiment of the bearing, the frame-like housing of the uncoupling element has at least one recess, by means of which the component is fixed in the completely assembled bearing in terms of its position in a cam provided for this purpose in the area of its mount. This recess in the housing of the uncoupling element may be embodied, e.g., in the form of a notch milled on the circumference of the frame-like housing. The assembly friendliness of the bearing increases additionally due to the possibility of fixing the position of the entire uncoupling element on the channel carrier.

In an especially advantageous embodiment, the membrane of the uncoupling element has on its surface on both sides at least one knob acting as a spacer in relation to the outer sleeve and the channel carrier. An unintended sag of the membrane is thus prevented, especially in the case of bearings with larger rubber cross section and the greater length of the membrane of the uncoupling element, which is associated herewith. An additional possibility of setting the uncoupling behavior is also given due to the shape, number and type of arrangement of the knobs. However, the vibration behavior of the membrane, and consequently also of the uncoupling element, can also be affected in a similar manner by designing the membrane as, e.g., a membrane that is fully corrugated or is corrugated in some sections or as a membrane structured in a similar manner rather than as a flat membrane.

According to a possible embodiment of the present invention, the housing of the uncoupling element may be formed from two frame elements, between which the membrane is fixed. Various possibilities are conceivable for fixing the membrane between the housing parts. Thus, the joining of the frame parts and the associated clamping of the membrane can be brought about by means of clip closures which hold together the frame parts and are provided on either one or both housing halves. This design can be further improved in an especially assembly-friendly manner by connecting the frame parts by hinges on one side and fixing the membrane by folding the parts over one another and locking in by means of the clip closure or clip closures.

However, it is also conceivable to fasten the membrane by simple clamping between the frame-like housing parts. However, it is finally also conceivable to design the housing as a one-part frame element and to fix the membrane, if it consists of rubber, on the frame of this element by vulcanization. Regardless of whether the housing has a one-part or two-part design, various materials, e.g., plastic or metal, may be used for the housing. It is also conceivable to manufacture the housing and the membrane from two different plastics according to a two-component process using the injection molding technique.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a front view of the uncoupling element;

FIG. 3 is a sectional view of the uncoupling element with a section along line A—A in FIG. 2;

FIG. 4 is a sectional view of the uncoupling element with a section along line C—C in FIG. 3.

DESCRIPTION OF THE PREFERRED EMBODIMENTS

Figure 1B:
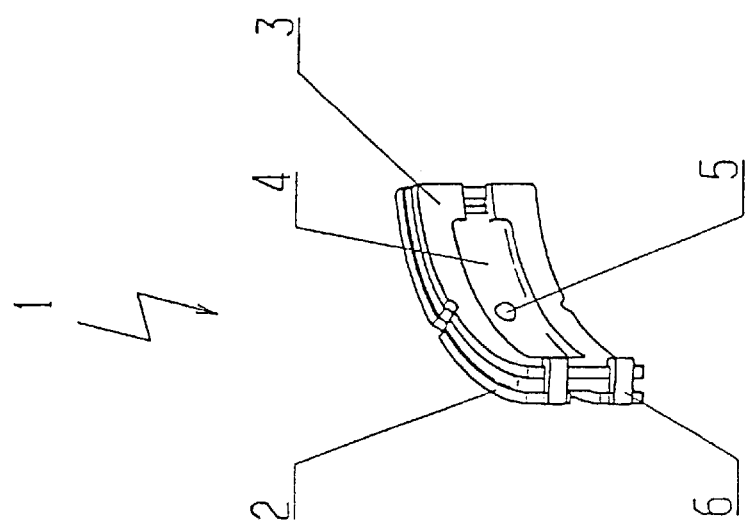
FIG. 1b is a perspective view of uncoupling element, in an unfolded state, designed as a separate component.
Figure 1A:
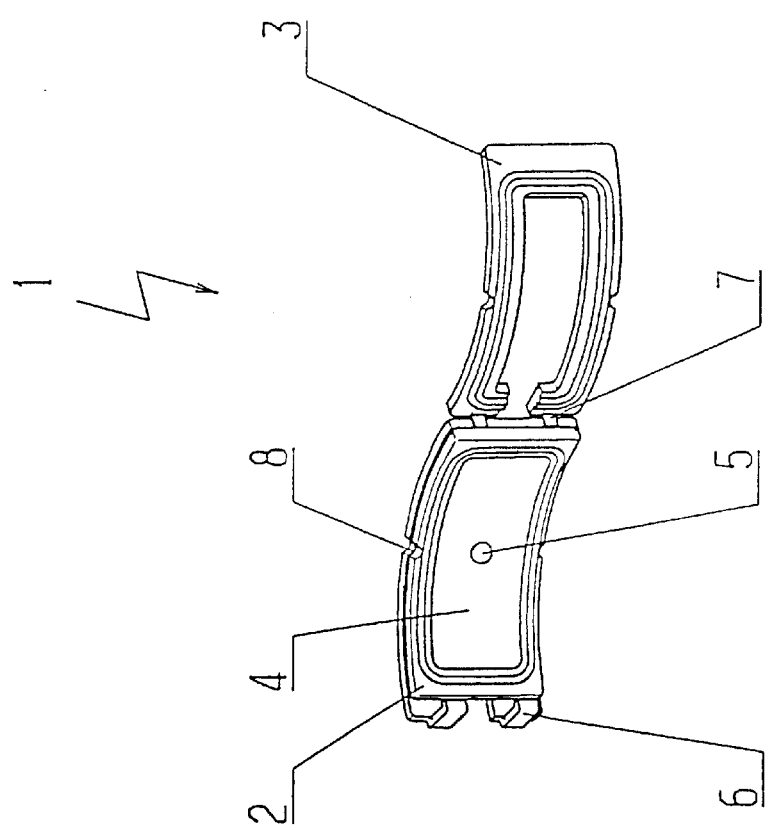
FIG. 1a is a perspective view of uncoupling element, in an unfolded state, designed as a separate component.

Referring to the drawings in particular, FIGS. 1a and 1b show the uncoupling element 1 of the bearing according to the present invention, which is designed, as can be recognized, as a separate component. In the example shown, the housing 2, 3 of the uncoupling element 1 is formed from two frame-like elements. The housing parts 2 and 3 are connected by a hinge 7 and between which a membrane 4 is fixed by these elements being folded over one another. The membrane 4 preferably consists of an elastomer. After being folded over one another, the frame parts 2, 3 are held together by a clip closure 6 provided for this purpose and they fix the membrane 4 between them. The membrane 4 may additionally also be connected to the housing parts 2, 3 by vulcanization. A knob 5, whose function shall be explained in greater detail in connection with the explanations to FIG. 3, is provided on the surface of the membrane 4. The frame-like housing parts 2, 3 of the uncoupling element 1, which consist of a plastic or a hard metal, have a notch 8 in the middle of their longitudinal sides. The uncoupling element 1 is fixed by means of this notch 8 during the mounting of the bearing to a cam provided for this purpose in the recess 13 for receiving the uncoupling element 1.

FIG. 2 once again illustrates the design of the uncoupling element 1 in a front view. The frame parts 2, 3 are folded over one another in the view and the membrane 4 is fixed between them by closing the clip closure 6.

The special function of the knob 5 on the surface of the membrane 4, which is already recognizable in FIG. 1, is once again illustrated by the view in FIG. 3. The view in FIG. 3 is a sectional view, in which the section was led along line A—A according to FIG. 2. As can be recognized from the view, one knob 5 each is provided on both sides of the membrane surface. This knob 5 acts as a spacer to the outer bearing sleeve 14 (on the side of the outer radius of curvature) and to the channel carrier 11 with the mount space 13 provided therein (on the side of the inner radius of curvature). Sagging of the membrane 4 is prevented by this spacer especially in bearings of larger cross section, in which the uncoupling element 1, which connects the mutually opposite damping chambers to one another, has a certain length. The amount of fluid that can be uncoupled can also be affected by varying the number of the spacers as well as by the type of their arrangement or by their shape, besides by varying the thickness of the membrane 4.

FIG. 4 once again shows the uncoupling element 1 in a sectional view with a section led along line C—C in FIG. 3. The membrane clamped between the frame parts 2, 3 as well as the clip closures 6 for closing the housing 2, 3 can be recognized beside the frame parts 2, 3.

Figure 5:
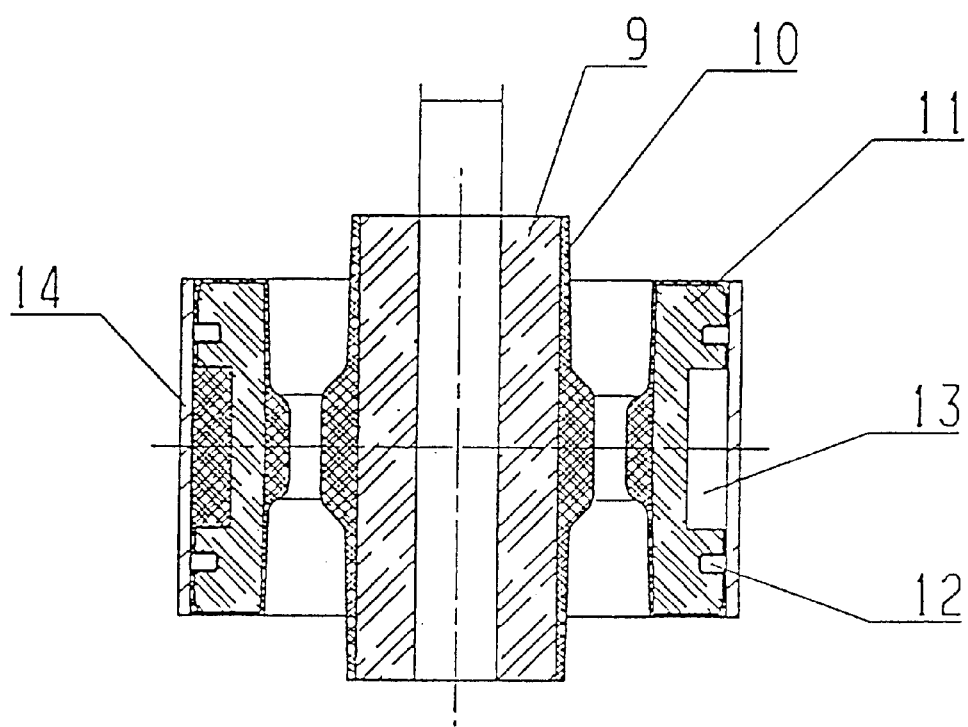
FIG. 5 is a sectional view of the hydraulically damping bearing with the mount for the uncoupling element.

The view in FIG. 5 shows the general design of the hydraulically damping bearing, illustrating the recess 13 provided in the channel carrier 11 to receive the uncoupling element 1. The bearing comprises, in the known manner, the cylindrical inner sleeve 9, the elastomer 10 connected to the inner sleeve, a channel carrier 11, which surrounds the two parts and in which the channels 12 provided connect the chambers for receiving the damping agent, not recognizable in the view, to one another, as well as an outer bearing sleeve 14 accommodating all the above-mentioned parts. Unlike in the design of such a bearing known from the state of the art, a recess 13 for receiving the uncoupling element 1, which also connects the damping agent chambers to one another. The recess 13 is provided in the channel carrier 11 in the bearing according to the present invention. The figure shows the bearing in a sectional view (axial section) without the insertion of the uncoupling element 1. Immediate pressure equalization is made possible between the damping agent chambers by the use of the insertable uncoupling element 1. When loads of low exciting amplitude occur the membrane 4, fixed in a freely vibrating manner between the housing parts 2, 3 of the uncoupling element 1, performs a radial movement in the direction of the channel carrier 11 or the outer sleeve 14 due to the forces acting on it. As a result, the pressure equalization is made possible via the connection of the damping agent chambers, which connection is created via the recess 13, without an appreciable volume flow of the damping agent circulating in the completely unobstructed damping agent channels 12 (e.g., no element needs to be disposed therein). An appreciable movement of the damping agent between the chambers through the channels 12 takes place only at higher amplitudes, as a result of which the effect of the mass damping develops. The degree of uncoupling of the damping action with respect to the amplitude of the acting forces depends, due to the special design of the bearing, especially on the thickness of the membrane 4 of the uncoupling element 1. Depending on the design of the membrane 4, exciting amplitudes which bring about a radial deflection of the bearing by up to 0.1 mm are uncoupled especially effectively. However, an uncoupling action can also be achieved for exciting amplitudes with a slightly greater deflection of the bearing if the uncoupling element 1 is dimensioned appropriately.

While specific embodiments of the invention have been shown and described in detail to illustrate the application of the principles of the invention, it will be understood that the invention may be embodied otherwise without departing from such principles.

What is claimed is:

1. A hydraulically damping rubber bearing, comprising:
   an inner part;
   an elastomer connected to said inner part by vulcanization;
   a channel carrier having at least two chambers for receiving a damping agent and a channel, said chambers being connected by said channel, said channel carrier having a recess in fluid communication with said chambers;
   an outer sleeve, said elastomer being arranged between said inner part and said outer sleeve; and
   an uncoupling element arranged in said channel carrier, said uncoupling element being provided for uncoupling the damping action caused by the circulation of the damping agent in said channel against forces of low exciting amplitude introduced radially into the bearing, said uncoupling element being provided as a separate component from the bearing to be arranged in said recess in said channel carrier, said separate component comprising a housing with a membrane fixed in a freely vibrating manner in said housing, a radial distance is assigned to said membrane between said channel carrier and said outer sleeve, allowing a radially directed movement of said membrane.

2. A hydraulically damping rubber bearing in accordance with claim 1, wherein said recess for receiving said uncoupling element extends equidistantly or in parallel to said channel provided for the circulation of the damping agent between the chambers.

3. A hydraulically damping rubber bearing in accordance with claim 1, further comprising a cam portion which provided in an area of said recess, said housing of said uncoupling element having at least one recess whereby said uncoupling element arranged in the bearing is fixed by said cam portion.

4. A hydraulically damping rubber bearing in accordance with claim 3, wherein said recess is in the form of a notch on an outer surface of said housing for being fixed by said cam portion.

5. A hydraulically damping rubber bearing in accordance with claim 1, wherein said membrane of said uncoupling element has at least two knobs acting as a spacer on both of two sides, against said outer sleeve and against said channel carrier.

6. A hydraulically damping rubber bearing in accordance with claim 1, wherein said housing of said uncoupling element comprises a first frame part and a second frame part, said membrane being fixed between said first frame part and said second frame part.

7. A hydraulically damping rubber bearing in accordance with claim 6, further comprising a clip closure provided on at least one said frame part wherein said frame parts are held together after the assembly of the bearing by said clip closure.

8. A hydraulically damping rubber bearing in accordance with claim 6, further comprising a hinge wherein said frame parts are connected to one another on at least one side by at least one hinge.

9. A hydraulically damping rubber bearing in accordance with claim 6, wherein said membrane is fixed between said frame parts of said housing by said frame parts being matingly clamped to one another.

10. A hydraulically damping rubber bearing in accordance with claim 1, wherein said membrane of said uncoupling element includes an elastomer and said housing consists of a plastic or a hard metal.

11. A hydraulically damping rubber bearing and insert combination, the combination comprising:
    a bearing with an inner part, an elastomer connected to said inner part by vulcanization, a channel carrier having at least two chambers for receiving a damping agent and a channel, said chambers being connected by said channel, said channel carrier having a recess in fluid communication with said chambers and an outer sleeve, said elastomer being arranged between said inner part and said outer sleeve; and
    an insert insertable in said recess in said channel carrier, said insert including an uncoupling element for uncoupling the damping action caused by the circulation of the damping agent in said channel against forces of low exciting amplitude introduced into the bearing, said uncoupling element comprising a housing with a membrane fixed in a freely vibrating manner in said housing, said recess defining a radial distance between said channel carrier and said outer sleeve, allowing a radially directed movement of said membrane when said insert is inserted in said recess.

* * * * *